I. F. THOMAS.
SUGAR BOX.
APPLICATION FILED NOV. 23, 1914.
1,152,992.
Patented Sept. 7, 1915.
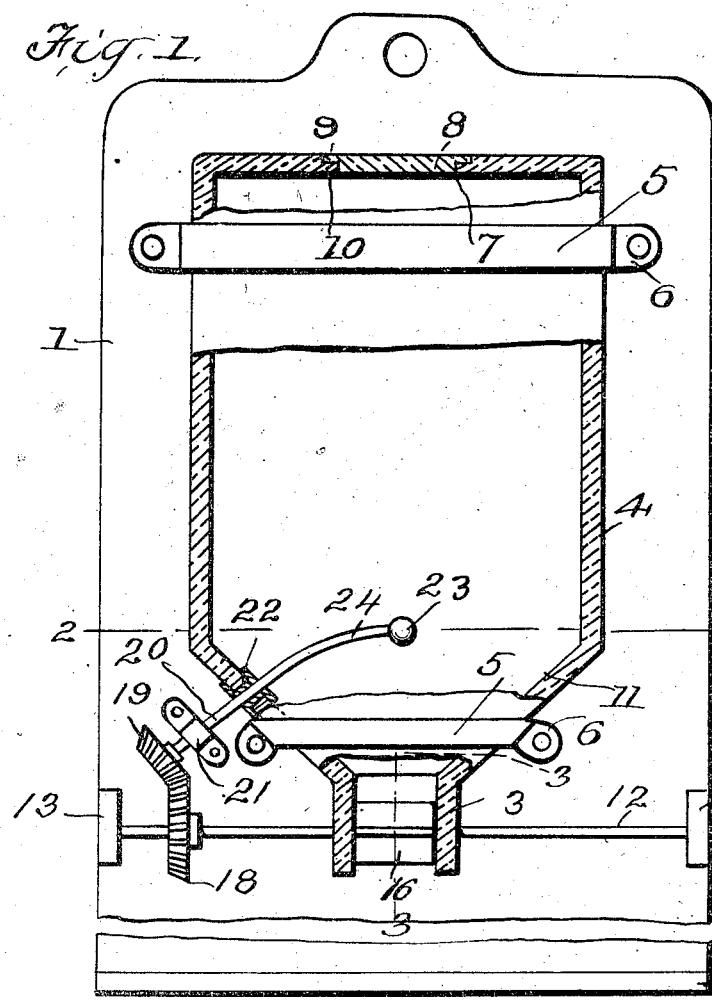
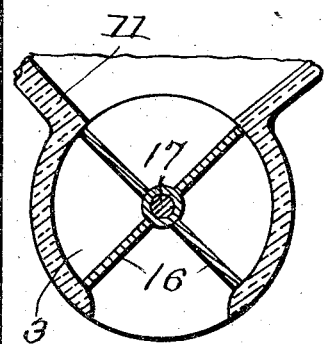
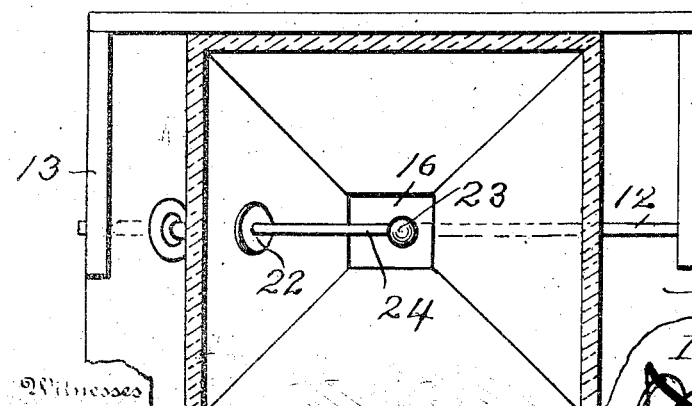
Inventor
I. F. Thomas

UNITED STATES PATENT OFFICE.

ISAIAH FREDRICK THOMAS, OF NORRISTOWN, PENNSYLVANIA, ASSIGNOR OF ONE-HALF TO EARL JOHNSON, OF NORRISTOWN, PENNSYLVANIA.

SUGAR-BOX.

1,152,992.     Specification of Letters Patent.     Patented Sept. 7, 1915.

Application filed November 23, 1914. Serial No. 873,574.

*To all whom it may concern:*

Be it known that I, ISAIAH F. THOMAS, a citizen of the United States, residing at Norristown, in the county of Montgomery and State of Pennsylvania, have invented certain new and useful Improvements in Sugar-Boxes; and I do hereby declare the following to be a full, clear, and exact description of the invention, such as will enable others skilled in the art to which it appertains to make and use the same.

This invention comprehends certain new and useful improvements in sugar boxes, and has for its primary object to provide a sugar box which will be constructed in such manner as to vend or feed out its contents as needed.

The invention has for another object to provide a device of this character which will be of such construction and operation that the sugar may be fed from the same without choking the lower portion of the sugar box on its way to the outlet opening thereof.

The invention has for a still further object to generally improve and simplify the construction and operation of sugar boxes of this character and increase the efficiency thereof, and provide a sugar box which will be of such form as to eliminate the necessity of the sugar being handled by customers and other parties desiring to obtain the same, thereby providing a sugar box which will be sanitary as well as highly efficient and durable in use.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which—

Figure 1 is a front elevation of my improved sugar box, partly in section, Fig. 2 is a transverse section, substantially on the plane of line 2—2 of Fig. 1, and Fig. 3 is a vertical transverse section on the plane of line 3—3 of Fig. 1.

Referring in detail to the drawings by numerals, 1 designates a supporting plate which may be secured to a wall or other stationary support and is provided with an outwardly directed lower end to provide a shelf 2 to support a cup or other vessel beneath the depending discharge spout 3 of the sugar box 4 to receive sugar from said box.

The sugar box 4 is secured against the supporting plate 1 by suitable clamping bands 5 positioned transversely across said sugar box 4 and having their opposite ends offset outwardly and secured to said plate 1, as shown at 6.

It will be understood that the sugar box 4 has a suitable filling opening 7 in its upper end with a cover 8 resting upon said filling opening 7, the cover 8 having an extended flange 9 for engagement upon the inwardly directed shoulder 10 around the edge of said opening 7, the cover 8 being preferably flush with the upper face of the sugar box 4.

It will further be understood that the discharge spout 3 is of substantially circular form in transverse section and is connected with the main portion or body of the box 1 by inclined walls 11 connecting the sides and ends of said discharge spout 3 with the sides and ends of the sugar box 4, and as one of the straps 5 is positioned across the inclined walls 11, downwardly movement of the box 4 upon the supporting plate 1 will be prevented.

Extended longitudinally through the center of the discharge spout 3 is a shaft 12 which has its opposite ends mounted in suitable bearings 13 at the opposite sides of the supporting plate 1 and one end of said shaft 12 is extended and bent at right angles, as shown at 14, and a handle 15 is secured to said end 14, whereby said shaft 12 may be readily rotated to revolve within the discharge spout 3, the feeding plates 16 which project radially from the sleeve 17 mounted upon the portion of the shaft 12 within said discharge spout 3. The feeding plates 16 are positioned at equal distances and while I have shown four of such plates, it will be understood that any suitable number of plates may be provided and as the shaft 12 is rotated the sugar will drop to position between two of the feeding plates 16 and be carried by the same around one side of the discharge spout 3 and deposited in the vessel positioned beneath said discharge spout 3, it being understood that the sugar is held against displacement during its movement through the discharge spout 3, owing to the fact that the feeding plates 16 are extended from end to end of the discharge spout 3 and have their outer ends positioned adjacent the curved side walls of said discharge spout 3.

The shaft 12 has a suitable beveled gear 18 mounted thereon adjacent one end and engaged with a bevel gear 19 mounted upon the outer end of the agitating shaft 20 which is mounted in a suitable bearing 21 positioned upon the supporting plate 1 and also extended through a bearing sleeve 22 positioned in one of the end inclined walls 11 so that the agitating ball 23 mounted upon the free extremity of the inner turned or curved end 24 of said agitating shaft 20 may be positioned above the discharge pipe 3 to agitate the sugar within the sugar box 4 as the shaft 12 is rotated and revolves the agitating shaft 20 to turn or swing around the bent or curved inner end 24 of said agitating shaft 20, thereby preventing the sugar from becoming wedged in the downwardly tapering lower end of the box 4 and caught against the inclined walls 11.

While I have shown and described the preferred embodiment of my invention, it will be understood that minor changes in the details of construction, combination and arrangement of parts may be made without departing from the spirit and scope of the invention as claimed or sacrificing any of the advantages thereof.

What is claimed is:—

A sugar box including a supporting plate, a box body mounted upon said supporting plate, means for securing said body in position, said body having a filling opening, means for closing said filling opening, a discharge spout, inclined walls connecting the discharge spout with the body of the box, said plate having a shelf projecting outwardly beneath the discharge spout, a shaft extended longitudinally through said discharge spout, a sleeve mounted upon said shaft, feeding blades projecting radially from said sleeve to feed out a predetermined quantity of the contents of the box body, means for rotating said shaft, means for supporting said shaft, an agitating shaft positioned at an angle to the first mentioned shaft and extended through one of the inclined walls, the inner end of said shaft being turned, a ball mounted upon the inner extremity of said agitating shaft, and operable connections between the first mentioned shaft and the agitating shaft to revolve the latter upon rotation of said first mentioned shaft.

In testimony whereof I affix my signature in presence of two witnesses.

ISAIAH FREDRICK THOMAS.

Witnesses:
 EARL W. JOHNSON,
 ESTHER G. JOHNSON.